United States Patent [19]
Kashihara et al.

[11] Patent Number: 5,028,945
[45] Date of Patent: Jul. 2, 1991

[54] ELECTRIC ZOOM CAMERA

[75] Inventors: Toshitsugu Kashihara, Nara; Hirohiko Ina, Nishinomiya; Toshihiko Taniguchi, Ikoma, all of Japan

[73] Assignee: West Electric Company, Ltd., Osaka, Japan

[21] Appl. No.: 584,100

[22] Filed: Sep. 18, 1990

[51] Int. Cl.$^5$ .............................................. G03B 3/10
[52] U.S. Cl. ................................................. 354/195.1
[58] Field of Search ...................................... 354/195.1

[56] References Cited
U.S. PATENT DOCUMENTS 4,972,215  11/1990  Kitamura et al. ............... 354/195.1

Primary Examiner—Michael L. Gellner
Attorney, Agent, or Firm—Cushman, Darby & Cushman

[57] ABSTRACT

Electric zoom camera wherein zooming speed is not influenced even by drop of power source voltage, by driving its zooming electric motor by an electric pulse current such that the period ($T_0$, $T_1$, $T_2$, - - -) is defined by present period of a lens position signal "b" from a lens position detector (2) which consists of a photo-interrupter and a photo-coupler, and each of the period length is divided into a first portion ($P_o$) (off-portion) wherein motor current is off and a second portion ($P_d$) (duty portion) wherein the motor current is on, the length of the first portion ($P_o$) being adjusted responding to the present zooming speed obtained from the lens position signal outputted from the lens position detector (2).

8 Claims, 4 Drawing Sheets

ELECTRIC ZOOM CAMERA

FIELD OF THE INVENTION AND RELATED ART STATEMENT

1. Field of the Invention

The present invention relates to an electric zoom camera, and particularly to an electric zoom camera wherein its zooming drivability is improved by making zooming speed of its zoom lens constant irrespective of various conditions of, e.g. power source voltage and change of mechanical characteristic of the zoom lens.

2. Description of the Related Art

Hitherto, there are conventionally known electric zoom cameras which comprise electric zoom lenses having electric motor as its driving source. In a conventional electric zoom camera, the zoom lens is continuously moved between its shortest end and longest end of focal length of the lens so that a desired focal length is selected and the driving is stopped at the desired position of driving.

In such driving, the driving, speed of the moving part of the zoom lens is selected at a considerably low speed so that the driving is easily stopped at a desired position not making an over-running by inertial of lens group and of the driving mechanism including the electric motor.

Accordingly, for instance the zoom lens needs to be driven from one extreme end of the adjustment to the other extreme end of the adjustment, and the user must wait for a considerable time period until the driving comes to a desired position. Therefore, sometimes the user loses best chance of shuttering that is the conventional electric zoom lens lacks quick handling ability.

Furthermore, the driving of the zoom lens is made during the pressing down of a switch button, and therefore, the user must continuously press down the switch buttom for the long driving time period of the zoom lens. And this also results in a poor handling.

Therefore, there are proposals to solve the problem.

A first proposal is made in the Japanese unexamined published patent application (Tokkai) Sho 64-25112. In this disclosure, the electric zoom lens has a control means for directly driving it to a first position at the point of shortest focal length and a second position at the point of the longest focal length and a switch for use only when the user wishes to drive the electric zoom lens quickly to the first position or the second position.

Another disclosure is made in the U.S. Pat. No. 4866468. This prior art discloses a two speed zooming system comprising a conventionally known normal zooming operation for continuously changing focal length of the electric zoom lens at a relatively slow normal speed which is selected by pressing down of a zoom button and a quicker zooming operation wherein the electric zoom lens is quickly driven to a preliminarily selected stopping position of plural stopping positions each time before the above-mentioned normal zooming operation. The quicker zooming speed is sufficiently faster than the normal zooming speed, and the two kinds of zooming operations are selectable by manual handling.

Both of above-mentioned prior arts can make the selection between selection of any focal length continuously in the variable range, and a high speed stepwise focal length selection, by manual selecting operation. Therefore, the above-mentioned prior arts can solve the problem of lack of quick handling and the problem of need of long time pressing down of the electric button.

The above-mentioned Tokkai Sho 64-25112 uses switching of gear train between the electric motor and the zoom lens, while the U.S. Pat. No. 4,866,468 uses switching between the continuous DC current and the pulse current of electric powers to be fed to the motor.

However none of the above-mentioned prior arts can achieve uniformity of the zooming speed at variations of power source voltage or of mechanical characteristic of the zoom lens.

For instance, in both prior arts, when the power source voltages change as a result of consumption of batteries or change to new batteries, their zooming speeds slow or greatly increase. Therefore, even though the user has become accustomed with the zooming speed of the lens after experiencing use of the apparatus for a considerable time, his experience is not fully utilized. And therefore, depending on the states of the battery, the zoom lens sometime overruns beyond his expect or sometimes stops considerably before his estimation of stop position.

Even though the variation of the voltage change of the power source may be compensated by use of a voltage adjusting circuit, a change of mechanical characteristic, such as mechanical resistance of the driving mechanism of the zoom lens or abrasion of cam in the mechanism will make further unexpected change of zooming speed after lapse of service time, and the resultant change of zooming speed can not be avoided.

OBJECT AND SUMMARY OF THE INVENTION

Therefore, the purpose of the present invention is to provide an improved electric zoom camera wherein zooming speed is controlled to achieve designed speeds, so that the user can handle the zoom lens always with the same feeling, even at change of power source voltage or change of mechanical characteristic of the zoom lens mechanism.

The above-mentioned object of the present invention is achieved by an electric zoom camera comprising:
  a zoom lens having a zoom-moving part,
  an electric motor linked to drive the zooming part,
  lens position detection means which generates lens position signal which is a pulse signal, responding to motion of the zooming part,
  speed detection means which generates a speed signal by receiving the lens position signal,
  comparison means for comparing data of the speed signal with a predetermined data,
  drive signal generating means which receive the lens position signal and generates a drive signal wherein period length is controlled to be equal to the period at present of the lens position signal, and
    each of the period length consists of a first portion for non-energy-feeding to the electric motor and a second portion for energy-feeding to the electric motor, the first portion being selected at a variable length and the second portion being the remainder of the period length,
  a motor driving circuit for producing a motor driving current wherein current is on during the second portion and off during the first portion, and
  control means which receives resultant data of the comparator and changes the variable length of the first portion.

It will be recognized that some or all of the Figures are schematic representations for purposes of illustration and do not necessarily depict the actual relative sizes or locations of the elements shown.

DESCRIPTION OF THE PREFERRED EMBODIMENTS

In the electric zoom camera of the present invention, its zooming speed is not influenced even by drop of power source voltage. This is attained by driving its zooming electric motor by an electric pulse current such that its period is defined by present period of a signal outputted from a lens position detector which consists e.g. of a photo-interrupter and a photo-coupler, and each the period lenght comprises a first portion wherein motor current is substantially off or limited and a second portion wherein the motor current is on, the length of the first portion being adjusted responding to the present zooming speed obtained from the signal outputted from the lens position detector.

Figure 1:
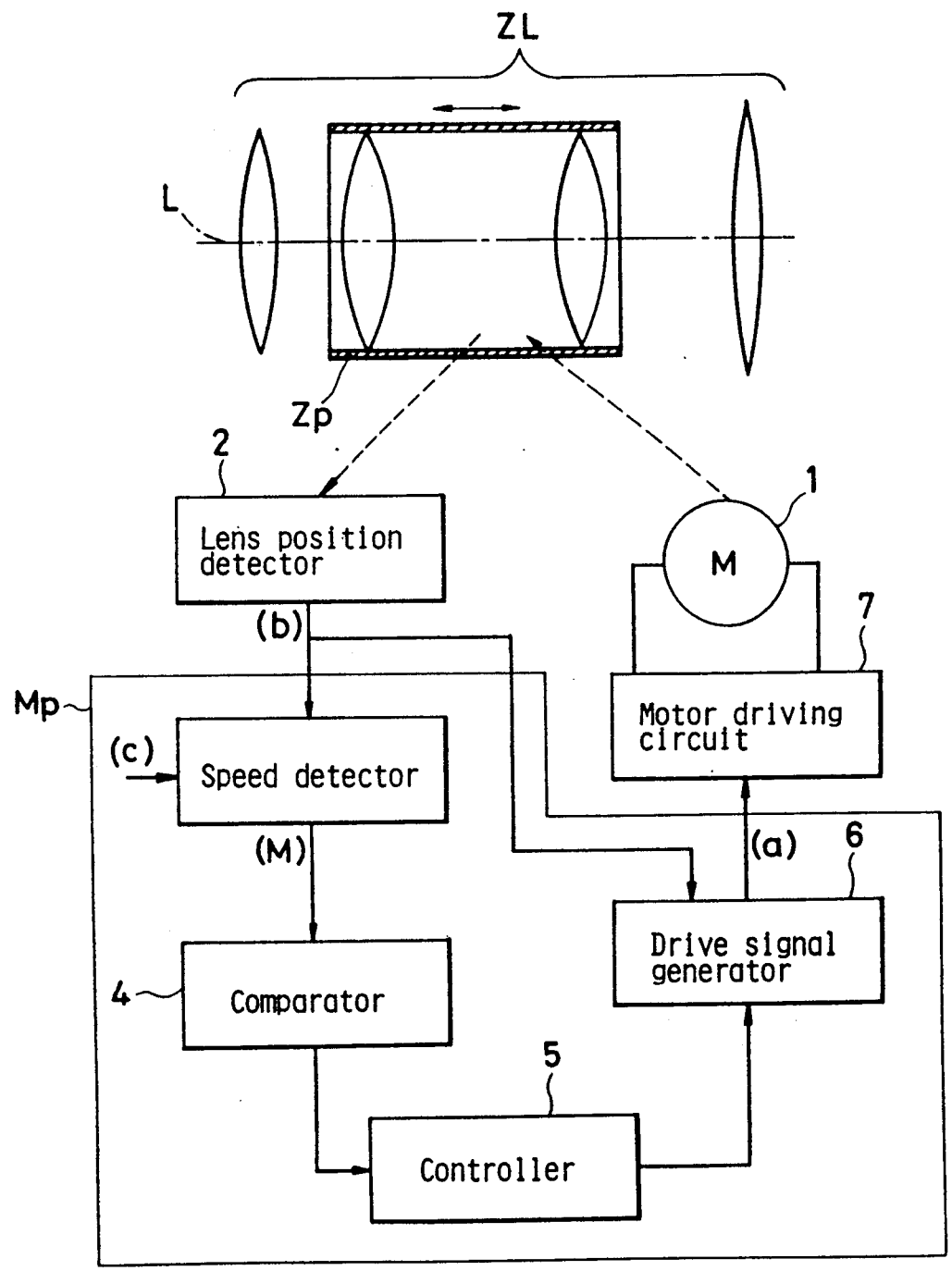
FIG. 1 is a circuit block diagram of a preferred embodiment of the electric zoom camera in accordance with the present invention.

FIG. 1 is a circuit block diagram showing a circuit configuration of a preferred embodiment of electric zoom camera in accordance with the present invention. In FIG. 1, mark ZL designates a zoom lens having a zooming part (a moving group of element lenses) Zp to vary its focal length. A lens position detector 2, e.g. a combination of a photo-interrupter such as comb-shaped member fixed to the zooming part Zp and a photo-coupler unit (consisting of an LED and a photo-transistor), and issues pulse train signal corresponding to movement of the zooming part. The period of the output pulse train is inverse-proportional to the moving speed of the zooming part.

The output pulse train signal of the lens position detector 2 is given to a speed detector 3. In the speed detector 3, time length of one period of the output signal from the lens position detector 2 is measured by counting number of pulse of a reference pulse signal (e.g. clock pulse) during the one period. And the output count number is given to a comparator 4.

The comparator 4 compares the given pulse signal from the speed detector 3 and compares the count, which is proportional to the lens moving speed, with a predetermined reference count number, thereby to issue the comparison result to a controller 5. The controller 5 issues a control signal to a drive signal generator 6. The drive signal generator 6 issues a drive signal "a", responding to the output signals given from the lens position detector 2 and the controller 5 and gives it to a motor driving circuit 7, which is, for instance, a power amplifier to produce a motor driving current. The drive signal issued by the drive signal generator 6 is generally a pulse train signal.

The drive signal generator 6 issues a pulse train output signal which has the same period with that of the output pulse train signal from the lens position detector 2. Each one period of the pulse train output of the drive signal generator 6 consists of a control-portion Po and has a given time length and an on-portion Pd wherein the motor current is made on. The control-portion Po is controlled by the control signal from the controller 5. The on-portion Pd has a time length which is balance of one period of output (b) of the lens position detector 2 minus the control-period Po, and hence, on-portion Pd varies responding to time length of the period $T_0$, $T_1$, $T_2$, --- or $T_n$ of the lens output "b" of the lens position detector 2 and to the control portion Po.

A driving current to be fed to the motor 1 from the motor driving circuit 7 is controlled responding to the contents of the drive signal given by the drive signal generator 6. During the control-portion Po of the drive signal impressed from the drive signal generator 6, the energy is not given to the motor 1. In case the control-portion Po consists of plural narrow pulses, very little energy is given during the off-portion Po. During the on-portion Pd of the drive signal impressed on the motor driving circuit 7, the energy is continuously given to the motor 1. The latter continuously giving of energy to the motor 1 during the on-period Pd forms a fundamental portion of the motor torque, and the former non-giving or pulsive giving of energy during the off-portion Po forms control portion of the motor torque.

Figure 2:
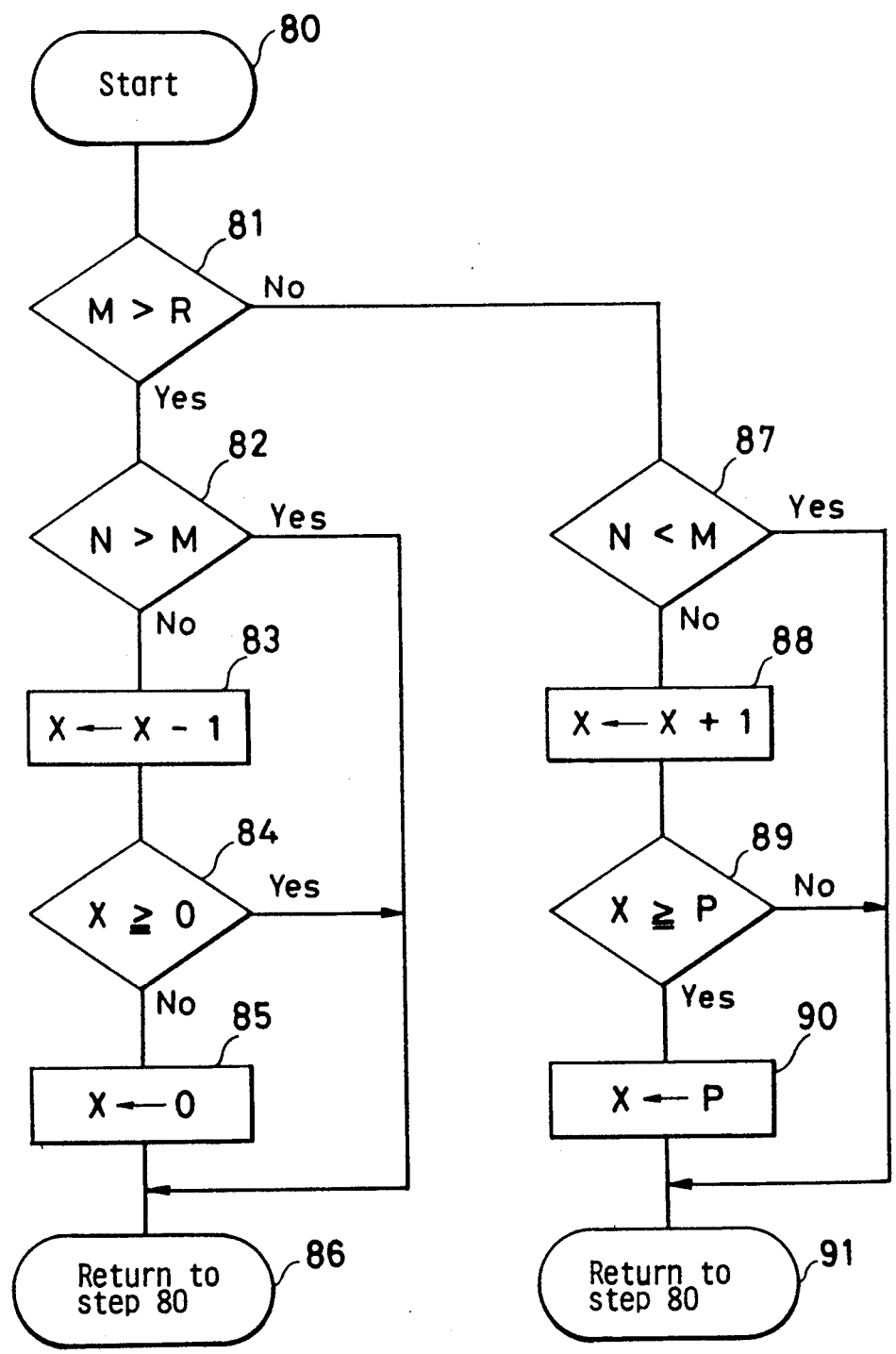
FIG. 2 is a flow chart showing operation of the circuit shown in FIG. 1.
Figure 3:
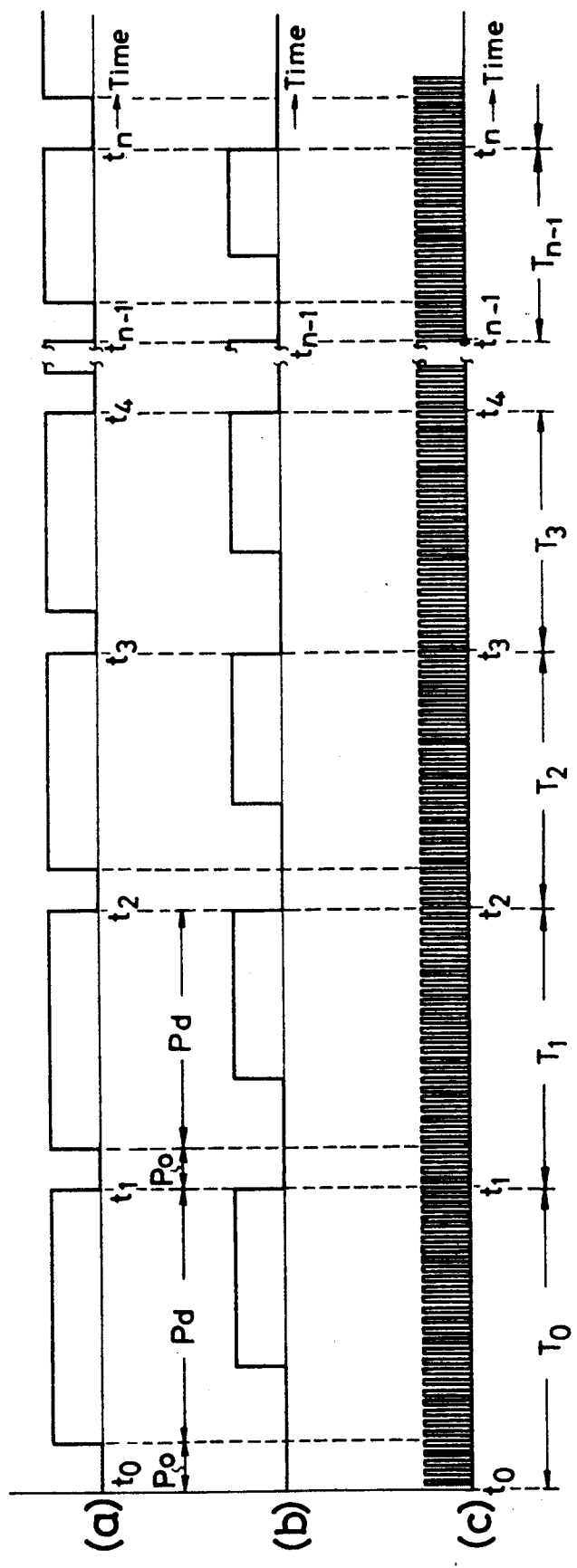
FIG. 3 is a waveform timing chart showing operation of the circuit shown in FIG. 1.

The operation of the electric zoom camera having the circuit of FIG. 1 is elucidated hereafter. It is provided that the circuits of speed detector 3, the comparator 4, the controller 5, the drive signal generator 6 are configurated by a microcomputer Mp, and FIG. 2 is a flow chart of the microcomputer. FIG. 3 shows waveforms at several parts of the circuit of FIG. 1.

OPERATION MODE I

When the zooming part reaches a predetermined speed in normal manner

When moving of a zoom lens ZL is instructed by a known arbitrary means, a drive signal "a" is given to the motor driving circuit 7 by the drive signal generator 6 constituted in the function of the microcomputer. The drive signal "a" is a pulse train signal as shown by a waveform (a) of FIG. 3, which has a varying repetition period $T_0$ ($t_0$ --- $t_1$), $T_1$ ($t_1$ --- $t_2$), $T_2$ ($t_2$ --- $t_3$), ... $T_{n-1}$ ($t_{n-1}$ --- $t_n$), .... Each cycle of the drive signal "a" from the drive signal generator 6 to the motor driving circuit 7 has the control-period Po, which is a variable and controlled period and the on-period or duty time period Pd which is a time period. In this example the control-period Po is off period wherein no energy is fed to the motor 1. The motor 1 is driven by receiving energy during the on-time period Pd from the motor driver circuit 7.

When the motor 1 is driven, the zoom lens start to move for zooming, and the lens position detector 2 issues output signal shown by the waveform (b) of FIG. 3.

The output signal "b" is inputted to the microcomputer Mp, wherein present count number as speed signal "M" is produced, for instance, by counting the number of clock pulses shown in (c) of FIG. 3 for one period $T_0$ or $T_1$ or --- of the output signal "b" of the lens position detector 2. This counting is made by the function which is shown as the speed detector 3.

Then, after lapse of one period $T_0$, the drive signal "a" falls to off-state.

Present count number M obtained by the above-mentioned counting of the clock pulse is the data to show the present moving speed of the zoom lens ZL. In the step 81 of FIG. 2, this present count number M is compared with a target number R which corresponds to the target moving speed at that time or state.

In the above-mentioned state, present count number M is larger than the predetermined target number R, since the zoom lens is just after its start of moving. That is, the present moving speed is yet smaller than the target moving speed.

Then, the flow in the flow-chart of FIG. 2 advances to the next step 82, wherein the above-mentioned present count number M is compared with immediately previous count number N which corresponds to the previously measured speed.

Since the zoom lens is at the state immediately after start of motion, that is, the previously measured speed was zero (0), the previous count number N corresponding to stop or rest state of the zoom lens is defined zero (0), and the process step advances to step 83.

In the step 83, a new reference number $(X-1)$ is set as a new data for showing the controlled control-period Po, in place of the previous reference number X.

After the above-mentioned setting, the processing flow advances to step 84, wherein examination is made whether the reference number X is larger than 0 or not. That is, it is examined whether the above-mentioned controlled control-period Po can be shortened or not. And the flow advances directly to step 86 (Return) in case that the Po can be shortened, or via step 85 which is for making the reference number X to 0 in case the control-period Po can not be shortened. And in both cases the flow returns to the start step 80.

Therefore, the control-period Po of the drive signal "a" is changed to a shorter one decreased by the above-mentioned decrease of reference number, namely, from X to $(X-1)$.

One concrete example of the above-mentioned operation is elucidated with reference to waveforms of FIG. 3.

Let us provide that a target number R to show the target moving speed is $R=20$, the reference number X to show initial controlled period (off-period) Po is $X=5$, and present count number M to show the above-mentioned first one period $T_0$ is $M=30$. Then, because the target number $R(=20)$ is smaller than the present count number $M(=30)$, (that is $20<30$), the process step goes through the step 81 to step 82; and in the step 82 the present count number $M(=30)$ is compared with the previous count number $N(=0)$ of the previous count number.

Since the previous count number $N(=0)$ is smaller than the present count number $M(=30)$, (that is $N<M$), the process step goes to step 83, wherein reference number X is subtracted by 1 to make 4; and in the next step 84 the resultant reference number $X(=4)$ is compared with zero, and the process step goes to step 86, since $X>0$ (that is $4>0$); and the process returns to the start step 80.

Therefore, after the time $t_1$ (the end of the first one period $T_0$), the drive signal "a" to be given to the motor driving circuit 7 has shorter off-period (controlled period) Po, and hence the moving of the zoom lens is accelerated.

Thereafter, at the time $t_2$ the speed is measured again. Let us provide that the present count number M is 28 this time. This present count number $M(=28)$ is still larger than the target number $R(=20)$. This shows that the present speed is slower than the target speed, and therefore the process step advances to the step 82. In this case, contrary to the afore-mentioned case of $N<M$, the present count number $M(=28)$ is smaller than the previous count number $N(=30)$, that is $N>M$. Therefore, the process step goes to the step 86, without going to the step 83, and the reference number of $X(=4)$ is retained unchanged. This implies that the present speed is slower than the target speed and an acceleration is necessary, and that the speed becomes larger than the previous measurement. In other words, the present drive signal "a" is functioning to accelerate the motor 1. Therefore, in this state there is no need to go to the step 83, which is to change the reference number of $X(=4)$ to a lower number (which corresponds to stronger acceleration than the present state.)

In the above-mentioned state, the present count number M gradually decreases to $M=26$ and further to $M=24$ in subsequent periods of $T_2$ and $T_3$, respectively, as is shown in the waveforms (a), (b) and (c) of FIG. 3.

By the comparison in the aforementioned step 81 at a time $t_n$ when the zoom lens ZL is accelerated, the present count number M becomes equal to or smaller than the target number R, and then the process step goes to step 87. In the step 87, the present count number M is compared with the previous count number N.

In this situation, provided that the present count number M becomes 19 as a result of the gradual acceleration, it is found that the number 19 is smaller than the previous count number $N(e.g.=21)$. Then, this means that the zooming speed is still accelerating beyond the target speed, and there is a need of deceleration. Hence the process step goes to step 88.

The step 88 is the step of increasing the reference number X to $(X+1)$. For instance, in the above-mentioned example the reference number X is increased from $X=4$ to $X=5$.

Then, the process step goes to step 89, wherein the new reference number $X(=5)$ is compared with a predetermined upper limit number P (e.g. $=8$) which is the upper limit of the reference number X.

When the reference number X is smaller than the upper limit number P, (in this case the present reference number $X=5$ is smaller than the upper limit number $P=8$,) the process goes to step 91 which means to return to the step 80. When the reference number X becomes equal to or larger than the upper limit number P, the process goes to step 90, wherein the reference number X is retained at the upper limit number P, and thereafter the process goes to the step 91 and returns to the step 80.

These steps 89 and 90 are steps for avoiding undesirable intermittent moving of the zoom lens ZL which occurs when the reference number X becomes too large, that is, when the control-period Po becomes too long, by limiting the reference number X not to exceed the upper limit number P.

At the time $t_n$ when the present count number M becomes equal to or smaller than the target number R, the reference number X increases by 1, and hence the length of control-period Po is increased, and thereby the moving speed of the zoom lens ZL is decreased.

Thereafter, the above-mentioned motion is repeated. That is, the present count number M corresponding to the present speed and the target number R are compared, and in compliance with the comparison result the length of control-period Po of the drive signal "a" is controlled. In this case, moving speed of the zoom lens ZL is retained slightly slower than the aforementioned target speed.

That is, when it becomes M=R, the process goes to step 87. And on the other hand, the steps after the step 87 is for decreasing moving speed of the zoom lens ZL as has been elucidated above. Therefore, the speed of the zoom lens is controlled as described above.

As a modified example, the step 81 may be constituted to compare M≧R, apart from M>R of FIG. 2.

In such modified case, when M=R, the process goes to the step 82. In the case, since the steps between 82 and 86 are for increasing speed of the zooming, the moving speed of the zoom lens ZL is controlled slightly faster than the target speed, in contrary to the aforementioned example wherein the speed is controlled slightly faster than the target speed.

As another modified example, the comparison steps 82 and 87 may be changed to N≧R and N≦M, apart from n>R and N<M of FIG. 2, respectively, thereby to control the condition of acceleration and deceleration slightly in other manner.

OPERATION MODE II

When the Zooming Speed is Limited to a Certain Speed Before Reaching the Target Speed, as a Result of Voltage Drop or the Like Trouble When a voltage drop occurs in a battery or an inverter circuit, the zooming speed can not be accelerated due to such failure being unable to reach the target speed.

In such case, the process flow goes from step 80 through step 81 to step 82. And furthermore, the present count number M is equal to the previous count number N (namely M=N) because the speed can not be accelerated or more; and therefore, the process goes to the step 83.

Therefore, the reference number X(=4) is decreased by 1, to make X=3. As a result, the driving energy to be given to the motor 1 is increased. And the similar processings of decreasing the reference number X by 1 hence increasing the driving energy of the motor 1 further continues until the reference numeral X becomes 0. By means of such processes, the zooming speed is accelerated even under the voltage drop of the power source.

If the present count number M becomes M=R or M<R before X's becoming 0, the process step goes to the step 87. Even when the present speed becomes slower than the previous measured speed hence resulting in N<M without passing the state of N=M, the step 83 is selected.

In the above-mentioned operation, the X's becoming 0 corresponds to such a state that the motor driving energy is fed continuously to the motor 1, namely that the zooming lens ZL moves at a possible maximum speed.

The above-mentioned electric zoom camera comprises a microcomputer as its means for processing data and signal, such as the drive signal generator 6. Therefore, the camera can be operated also in the below-mentioned way, to achieve a more useful technical advantage.

In order to attain a quicker acceleration in zooming operation so as to reach the target speed quickly, during a time period of one to several periods immediately after start of moving of the zooming, the drive signal "a" of FIG. 3 is made whole (continuously) on. Thereby, a stronger acceleration is obtainable.

Figure 4:
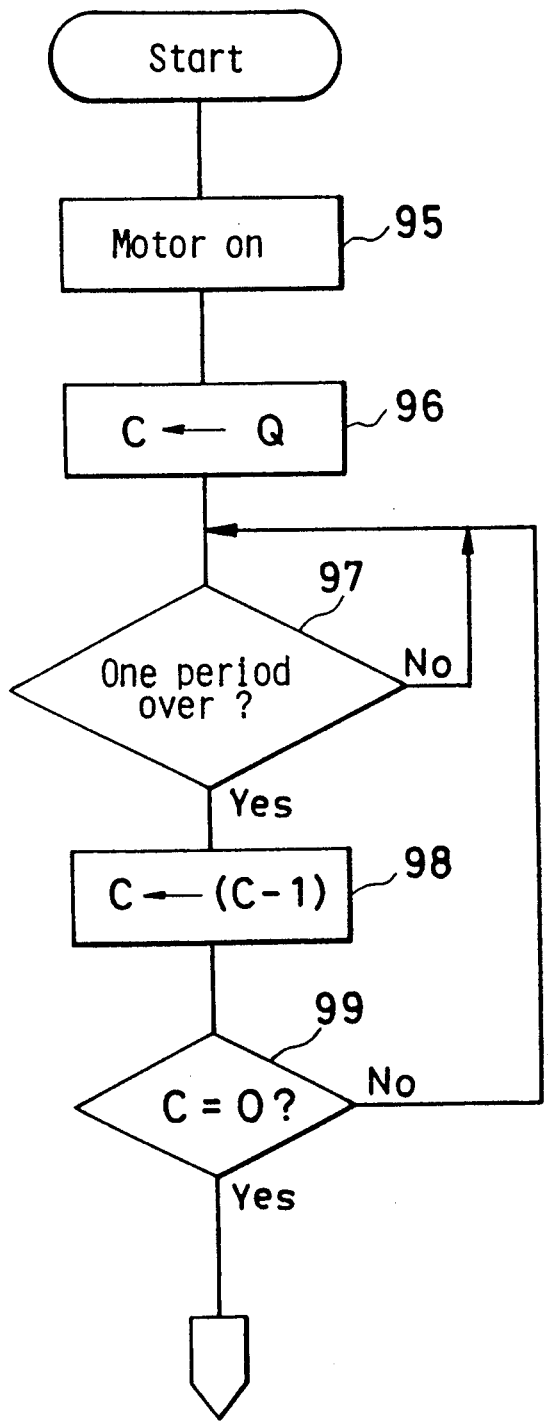
FIG. 4 is a flow chart for showing another operation of the electric zoom camera in accordance with the present invention.

FIG. 4 is an example of flow chart for executing the above-mentioned quick acceleration operation immediately after the start of zooming. The process of the flow chart of FIG. 4 is to be executed before the start of the process of FIG. 2.

The operation of the flow chart of FIG. 4 is as follows. When zooming of the zoom lens ZL is instructed, the process goes to step 95 to electrify the motor 1.

Then the process advances to step 96, wherein a predetermined number Q (e.g. an integer of from 1 to 5) for designating the above-mentioned one to several periods is set as the number C to be set in the counter. Thereafter in step 97, lapse of one period of the output signal of the lens position detector 2 is examined.

The flow chart does not advance when the above-mentioned one period does not lapse yet. But the flow chart advances to step 98 when the above-mentioned one period has lapsed; and a new number (C−1), which is made by deducing 1 from the set number C in the counter, is set in the counter in place of the previously set number C.

The above-mentioned newly set number (C−1) is examined in the next step 99 whether it is 0 or not. And the process goes to step 97 when the newly set number (C−1) is not 0, and the drive signal "a" becomes whole on, thereby driving the motor at the maximum driving power.

On the contrary, when the new set number is 0, the process moves to another operation mode (not shown) which enables entering to the flow chart of FIG. 2.

As has been described above, the motor 1 can be driven by continuous current until lapse of several periods immediately after the start of zooming, by instruction of one to several periods of output signal of the lens position detector 2, being determined by the step 96. Therefore, the zoom lens is accelerated quickly to reach the target speed, without loss of time.

As has been described with regard to preferred embodiments, the electric zooming camera can substantially attain the target zooming speed even when the motor torque decreases owing to the decrease of the power source voltage or the like reason, and therefore, the camera affords an always constant manner of zooming.

Furthermore, according to the present invention, acceleration of the zooming speed can be specially increased only in a limited short time period of several periods, taking special process in the flow of FIG. 4, and the zooming can be very quick.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An electric zoom camera comprising:
   a zoom lens having a zoom-moving part,
   an electric motor linked to drive said zooming part,
   lens position detection means which generates lens position signal which is a pulse signal, responding to motion of said zooming part,
   speed detection means which generates a speed signal by receiving said lens position signal, comparison means for comparing data of said speed signal with a predetermined data, drive signal generating means which receive said lens position signal and generates a drive signal wherein period length is controlled to be equal to the period at present of said lens position signal, and each of said period length consists of a first portion for non-energy-feeding to said electric motor and a second portion for energy-feeding to said electric motor, said first portion being selected at a variable length and said second portion being the remainder of said period length, a motor driving circuit for producing a motor driving current wherein current is on during the second portion and off during the first portion, and control means which receives resultant data of said comparator and changes said variable length of said first portion.

2. An electric zoom camera in accordance with claim 1, wherein said first portion is eliminated thereby making said period all of said second portion, and thereby feeding only on-current continuously to said motor for first several period from start of said lens position signal.

3. An electric zoom camera in accordance with claim 1 or 2 wherein said first portion is an off-portion and said second portion is an on-portion.

4. An electric zoom camera comprising:

a zoom lens having a zoom-moving part, an electric motor linked to drive said zooming part, lens position detection means which generates lens position signal which is a pulse signal, responding to motion of said zooming part, speed detection means which generates a speed signal by receiving said lens position signal, comparison means for comparing data of said speed signal with a predetermined data, drive signal generating means which receive said lens position signal and generates a drive signal wherein period length is controlled to be equal to the period at present of said lens position signal, and each of said period length consists of a first portion for reduced-energy-feeding to said electric motor and a second portion for energy-feeding to said electric motor, said first portion being selected at a variable length and said second portion being the remainder of said period length, a motor driving circuit for producing a motor driving current wherein current is on during the second portion and off during the first portion, and control means which receives resultant data of said comparator and changes said variable length of said first portion.

5. An electric zoom camera in accordance with claim 4, wherein said first portion is eliminated thereby making said period all of said second portion, and thereby feeding only on-current continuously to said motor for first several period from start of said lens position signal.

6. An electric zoom camera in accordance with claim 4 or 5 wherein said first portion is an off-portion and said second portion is an on-portion.

7. An electric zoom camera in accordance with claim 4 or 5 wherein said first portion is a high frequency pulse portion and said second portion is an on-portion.

8. An electric zoom camera comprising:

a zoom lens having a zoom-moving part, an electric motor linked to drive said zooming part, lens position detection means which generates lens position signal which is a pulse signal, responding to motion of said zooming part, speed detection means which generates a speed signal by receiving said lens position signal, comparison means for comparing data of said speed signal with a predetermined data, drive signal generating means which receive said lens position signal and generates a drive signal wherein period length is controlled to be equal to the period at present of said lens position signal, and each of said period length consists of a first portion for controlled-energy-feeding to said electric motor and a second portion for energy-feeding to said electric motor, said first portion being selected at a variable length and said second portion being the remainder of said period length, a motor driving circuit for producing a motor driving current wherein current is on during the second portion and off during the first portion, and control means which receives resultant data of said comparator and changes said variable length of said first portion.

* * * * *